(12) United States Patent
Nemeth et al.

(10) Patent No.: US 12,510,014 B2
(45) Date of Patent: Dec. 30, 2025

(54) DOSING INJECTOR BRACKET ASSEMBLY

(71) Applicant: FCA US LLC, Auburn Hills, MI (US)

(72) Inventors: Michael L Nemeth, Holly, MI (US); Kevin A Spangler, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 113 days.

(21) Appl. No.: 18/514,209

(22) Filed: Nov. 20, 2023

(65) Prior Publication Data
US 2025/0163841 A1    May 22, 2025

(51) Int. Cl.
*F01N 13/18* (2010.01)

(52) U.S. Cl.
CPC ...... *F01N 13/1855* (2013.01); *F01N 2260/18* (2013.01); *F01N 2260/20* (2013.01); *F01N 2340/04* (2013.01); *F01N 2610/1453* (2013.01)

(58) Field of Classification Search
CPC ............ F01N 13/1805; F01N 13/1855; F01N 3/2066; F01N 2260/18; F01N 2260/20; F01N 2340/04; F01N 2610/1453
See application file for complete search history.

(56) References Cited

U.S. PATENT DOCUMENTS

| | | | |
|---|---|---|---|
| 3,735,950 A * | 5/1973 | Paintin | F16L 25/04 248/62 |
| 6,996,976 B2 * | 2/2006 | Rumminger | F16L 41/12 60/272 |
| 9,366,174 B2 * | 6/2016 | Hottebart | F01N 13/1805 |
| 9,546,584 B2 | 1/2017 | Qi | |
| 2015/0226101 A1 * | 8/2015 | Nishimura | F01N 3/103 123/456 |
| 2015/0240448 A1 * | 8/2015 | Mori | F01N 3/208 701/50 |
| 2016/0153341 A1 * | 6/2016 | Forshier | F01N 13/1811 248/205.1 |

* cited by examiner

*Primary Examiner* — Grant Moubry
(74) *Attorney, Agent, or Firm* — Jeremy J. Klobucar

(57) ABSTRACT

A bracket assembly for locating an injector relative to a vehicle exhaust component including a first bracket configured to be attached to a cross-beam of a vehicle frame; and a second bracket configured to be attached to the first bracket and including a primary panel configured to support the injector relative to the vehicle exhaust component The first bracket includes a first end, an opposite second end, and a planar section connecting the first end and the opposite second end, the first end, the opposite second end, and the planar section collectively defining a seat configured for receipt of the cross-beam; and the second bracket includes a first arm extending outward from the primary panel configured to mate with the first end and a second arm extending outward from the primary panel configured to mate with the second end.

10 Claims, 6 Drawing Sheets

DOSING INJECTOR BRACKET ASSEMBLY

FIELD

The present disclosure relates to a dosing injector bracket assembly.

BACKGROUND

This section provides background information related to the present disclosure which is not necessarily prior art.

Vehicles having diesel engines may have an exhaust after-treatment system that chemically treats the exhaust to eliminate or at least substantially reduce various chemical species (e.g., NOx) that are present in the diesel engine exhaust stream. In some exhaust after-treatment systems there are components such as, for example, a selective catalytic reduction (SCR) canister and a diesel particulate filter (DPF) canister. An injector may be located upstream of the SCR canister for injecting a diesel exhaust treatment fluid such as an aqueous urea solution that interacts with the catalysts contained in the SCR canister to chemically treat the various chemical species in the engine exhaust.

In addition, an injector may be located upstream from the DPF for injecting a hydrocarbon fluid (e.g., diesel fuel) into the exhaust stream upstream from the DPF. In this regard, during use of the DPF, the filter located in the DPF canister may become covered in soot that needs to be removed. By injecting hydrocarbon fluid into the exhaust stream upstream from the DPF, a temperature of the exhaust gases can increase to burn off the soot to "regenerate" the DPF filter.

In either of these cases, it is necessary to mount the injector at a location proximate the SCR canister and the DPF canister. Unfortunately, packaging of the injector can become difficult in a given vehicle envelope because a preferred location of the injector may be obscure or inhibit installation of the exhaust component itself. In this regard, the injector is typically first attached at the desired location and then the exhaust component is attached to the vehicle at a later time. If the location of the injector is very close to the location of the exhaust component, the injector can be damaged or inhibit installation of the exhaust component altogether Thus, there is a need for the injectors to be positioned into the packaging envelope without prohibiting or hampering installation of the exhaust components.

SUMMARY

This section provides a general summary of the disclosure, and is not a comprehensive disclosure of its full scope or all of its features.

According to a first aspect of the present disclosure, there is provided a bracket assembly for locating an injector relative to a vehicle exhaust component. The assembly may include a first bracket configured to be attached to a cross-beam of a vehicle frame; and a second bracket configured to be attached to the first bracket and including a primary panel configured to support the injector relative to the vehicle exhaust component, wherein the first bracket includes a first end, an opposite second end, and a planar section connecting the first end and the opposite second end, the first end, the opposite second end, and the planar section collectively defining a seat configured for receipt of the cross-beam; and the second bracket includes a first arm extending outward from the primary panel configured to mate with the first end and a second arm extending outward from the primary panel configured to mate with the second end.

According to the first aspect, the first arm includes a first section co-planar with the primary panel, a second section that extends orthogonally outward and downwardly from the first section, and a third section that extends orthogonally outwardly from the second section and is configured to be attached to the first end of the first bracket.

According to the first aspect, the second arm includes a first section co-planar with the primary panel having a downwardly extending leg that transitions to a second section that extends substantially orthogonally outward from the leg and is configured to be attached to the opposite second end of the first bracket.

According to the first aspect, the second bracket includes a third arm co-planar with the primary panel that extends downwardly from the primary panel and transitions to a pad that extends outward the third arm.

According to the first aspect, the bracket assembly may also include a heat shield attached to the second bracket that is configured to shield the injector from heat generated by the exhaust component.

According to the first aspect, the first bracket includes an outwardly extending tab connected to one of the first end and the opposite second end.

According to the first aspect, the outwardly extending tab defines an aperture configured for receipt of a clip.

According to the first aspect, the planar section is offset from the first end and the opposite second end.

According to the first aspect, the planar section is connected to the first end and the opposite second end by downwardly extending connection sections that, in combination with the first end, opposite second end, and planar section, define the seat.

According to the first aspect, each of the first bracket and the second bracket include a plurality of strengthening ribs.

According to a second aspect of the present disclosure, there is provided a method for installing an injector relative to an exhaust component of an exhaust system on a vehicle frame including a cross-beam. The method may include attaching a first bracket to the cross-beam; after attaching the first bracket to the cross-beam, connecting the exhaust component to the exhaust system; and after connecting the exhaust component to the exhaust system, attaching a second bracket carrying the injector to the first bracket, wherein a second bracket configured to be attached to the first bracket and including a primary panel configured to support the injector relative to the vehicle exhaust component, wherein the first bracket includes a first end, an opposite second end, and a planar section connecting the first end and the opposite second end, the first end, the opposite second end, and the planar section collectively defining a seat configured for receipt of the cross-beam; and wherein the second bracket includes a primary panel, a first arm extending outward from the primary panel configured to mate with the first end, and a second arm extending outward from the primary panel configured to mate with the second end.

According to the second aspect, the first arm includes a first section co-planar with the primary panel, a second section that extends orthogonally outward and downwardly from the first section, and a third section that extends orthogonally outwardly from the second section and is configured to be attached to the first end of the first bracket.

According to the second aspect, the second arm includes a first section co-planar with the primary panel having a downwardly extending leg that transitions to a second section that extends substantially orthogonally outward from the leg and is configured to be attached to the opposite second end of the first bracket.

According to the second aspect, the second bracket includes a third arm co-planar with the primary panel that extends downwardly from the primary panel and transitions to a pad that extends outward the third arm.

According to the second aspect, the second bracket may include a heat shield that is configured to shield the injector from heat generated by the exhaust component.

According to the second aspect, the first bracket includes an outwardly extending tab connected to one of the first end and the opposite second end.

According to the second aspect, the outwardly extending tab defines an aperture configured for receipt of a clip.

According to the second aspect, the planar section is offset from the first end and the opposite second end.

According to the second aspect, the planar section is connected to the first end and the opposite second end by downwardly extending connection sections that, in combination with the first end, opposite second end, and planar section, define the seat.

According to the second aspect, each of the first bracket and the second bracket include a plurality of strengthening ribs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
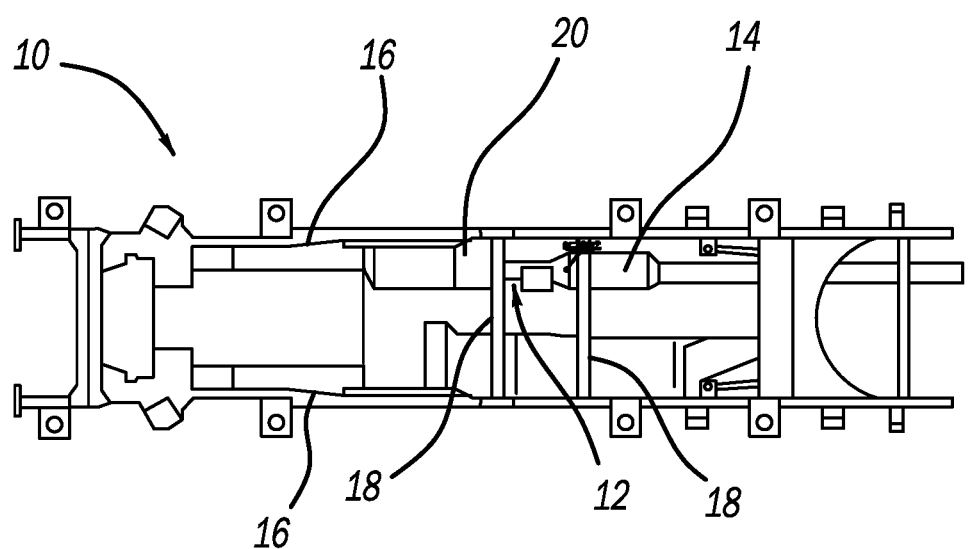
FIG. 1 is a schematic representation of a vehicle frame having an exhaust system and an injector assembly for providing a fluid to a component of the exhaust system.

FIG. 1 illustrates a vehicle frame 10 that is configured to support various features of a vehicle (not shown) such as a powertrain (i.e., engine and transmission, not shown), a vehicle body (not shown), and an exhaust system 12 including at least one exhaust component 14, which in the illustrated embodiment may be one of a selective catalytic reduction (SCR) component or a diesel particulate filter (DPF) component. Frame 10 includes a pair of side rails 16 that are connected to each other using at least one cross-beam 18.

Exhaust system 12 may include at least one injector or valve assembly 20 configured to be mounted to one of the cross-beams 18 for dosing a fluid into the exhaust stream generated by the engine (not shown) that passes through the exhaust component 14. If the exhaust component 14 is an SCR component, the fluid that is dosed into the exhaust stream by the valve assembly 20 may be an aqueous urea-based solution as is known in the art. If the exhaust component is a DPF component, the fluid may be a hydrocarbon fluid (e.g., diesel fuel) that can increase a temperature of the exhaust stream to regenerate the DPF, as is known in the art. Valve assembly 20 may be attached to one of the cross-beams 18 using a bracket assembly 22, as will be discussed in more detail below.

Figure 2:
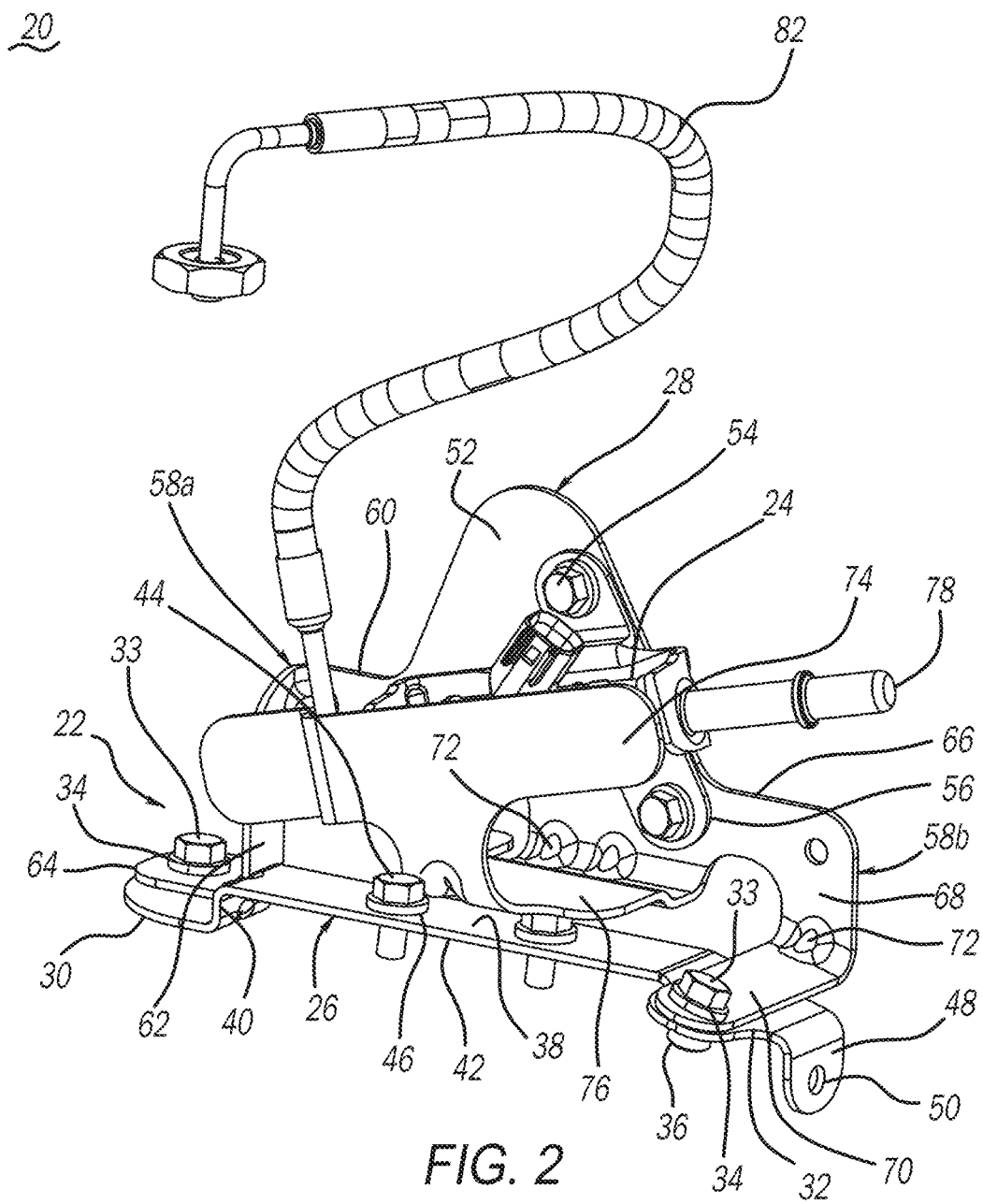
FIG. 2 is an isometric perspective view of the injector assembly.
Figure 3:
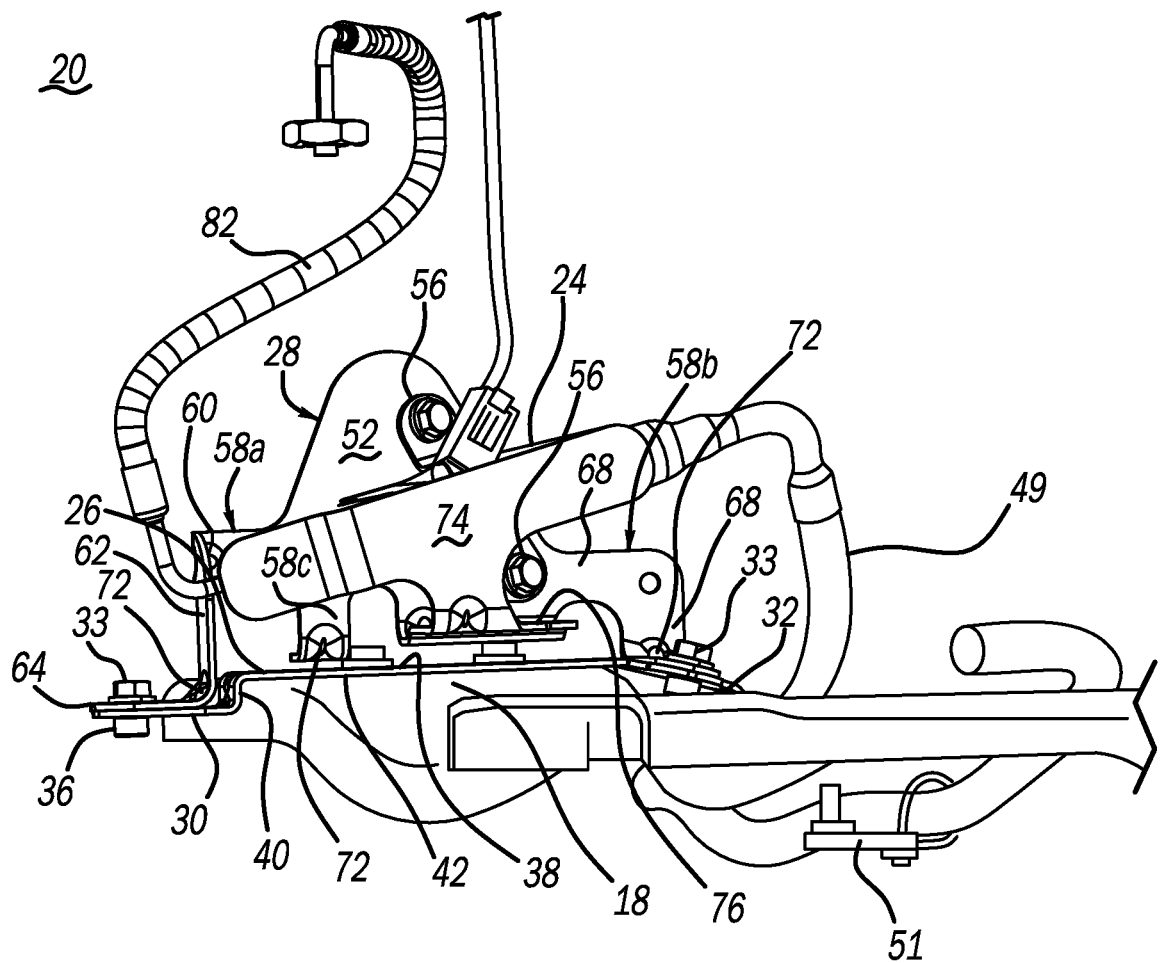
FIG. 3 is a side-perspective view of the injector assembly.

Now referring to FIGS. 2 and 3, valve assembly 20 is illustrated. Valve assembly 20 includes an injector or valve 24 attached to bracket assembly 22. Bracket assembly 22 includes a first bracket 26 that is configured to be fixed to one of the cross-beams 18 and a second bracket 28 configured to support the valve 24 and be attached to the first bracket 26.

First bracket 26 may be formed of a rigid material such as steel or aluminum. First bracket 26 is an elongated member having a first end 30 and an opposite second end 32 that are each configured (via an aperture formed therein (not shown)) to be attached to second bracket 28 by a fastener 33 such as a bolt, a washer 34, and a nut 36. A planar section 38 connects first end 30 and second end 32. Moreover, in the illustrated embodiment, planar section 38 is offset from first end 30 and second end 32. That is, planar section 38 is connected to first end 30 and second end 32 by downwardly extending connection sections 40, where the combination of planar section 38 and connection sections 40 defines a seat 42 that is configured for receipt of the cross-beam 18 to which first bracket 26 is attached. After locating first bracket 26 over cross-beam 18 and mating cross-beam 18 in seat 42, planar section 38 can be fixed to cross-beam 18 using fasteners 44 and washers 46.

While not required by the present disclosure, it should be understood that one of first end 30 and second end 32 may include an outwardly extending tab 48 having a through-hole 50 formed therein. Tab 48 is configured as a support member for an inlet tube 49 (see FIG. 3) that provides the fluid for injection to injector or valve 24. In this regard, through-hole 50 is configured for receipt of a clip 51 (see FIG. 3) that can orient inlet tube toward injector or valve 24. While second end 32 is illustrated as including tab 48, it should be understood that first end 30 may include the tab 48 instead, or each of first end and second end 30 and 32 can include the tab 48 and the installer of valve assembly 20 can determine which tab 48 is selected for receipt of the clip 51 to orient the inlet tube 49.

Figure 4:
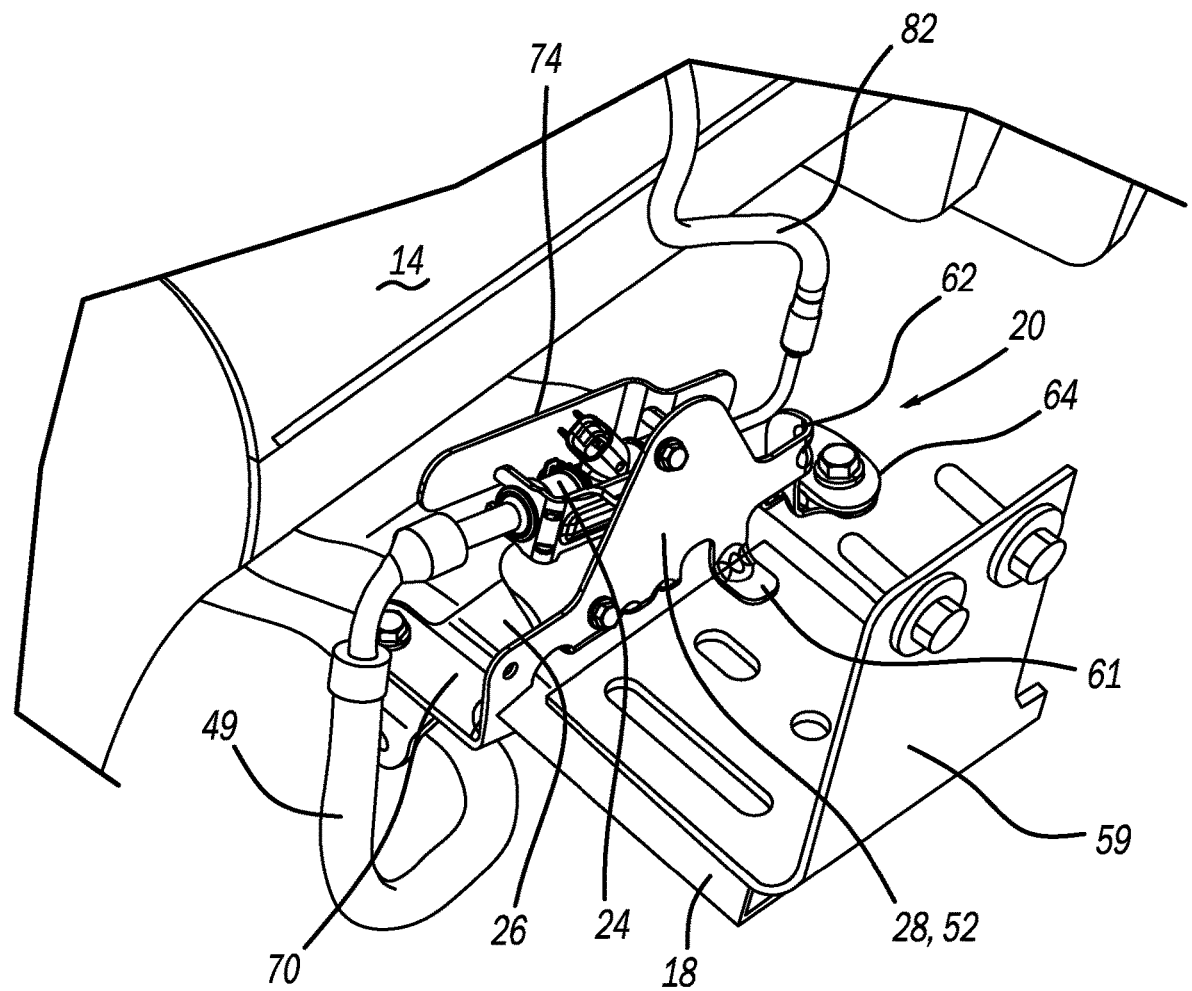
FIG. 4 is an isometric perspective view of the injector assembly mounted proximate to the component of the exhaust system.

Second bracket 28 includes a primary panel or plate 52 that is configured to support injector or valve 24. In this regard, primary panel 52 includes a pair of apertures (not shown) that are configured for receipt of a fastener 54 that secures outwardly extending flanges 56 of injector or valve 24 to primary panel 52. A pair of arms 58*a* and 58*b* extend outward from primary panel 52 that are configured to be connected to first and second ends 30 and 32, respectively, of first bracket 26. In addition, a third arm 58*c* (FIG. 3) may extend downward from primary panel 52 that is configured to connect second bracket 28 to a connection bracket 59 (FIG. 4) that connects cross-beam 18 to one of the side rails 16.

Arm 58*a* includes a first section 60 co-planar with primary panel 52, a second section 62 that extends orthogonally outward and downwardly from first section 60, and a third section 64 that extends orthogonally outward from second section 62. Third section 64 is configured to be attached to first end 30 of first bracket 26 via fastener 33.

Arm 58*b* includes a first section 66 co-planar with primary panel that includes a downwardly extending leg 68 that transitions to a second section 70 that extends substantially orthogonally outward from leg 68. Second section 70 is configured to be attached to second end 32 of first bracket 26 via fastener 33.

Arm 58*c* includes an outwardly extending pad 61 (FIG. 4) configured to abut connection bracket 59 when assembly 20 is attached to cross-beam 18.

Strengthening ribs 72 may be positioned at the transition first section 60 and second section 62 of arm 58*a* and the transition between second section 60 and third section 64 of arm 58*a*, and between leg 68 and second section 70 of arm 58*b* that increases the rigidity of the connection between arms 58*a* and 58*b* and first end 30 and second end 32 of first bracket 26. Arm 58*c* may also include a strengthening rib 72 at the transition to pad 61.

Although not required, second bracket 28 may include a heat shield 74 that is configured to protect injector or valve 24 from heat generated by the exhaust gases passing through exhaust system 12. Heat shield 74 may be unitary with primary panel 52 and connected thereto by a connection flange 76 that extends outward from a bottom of primary panel 52. A plurality of the strengthening ribs 72 can be formed between primary panel 52 and connection flange 76.

Injector or valve 24 may be any type of injector known to one skilled in the art for injecting fluid into the exhaust component 14. As noted above, injector or valve 24 is configured to be connected to inlet tube 49. In this regard, injector or valve 24 includes an inlet 78 configured to be connected to inlet tube 49. Injector or valve 24 also includes an outlet 80 configured to be connected to an outlet tube 82 that is fluidly connected to the exhaust component 14.

Figure 5:
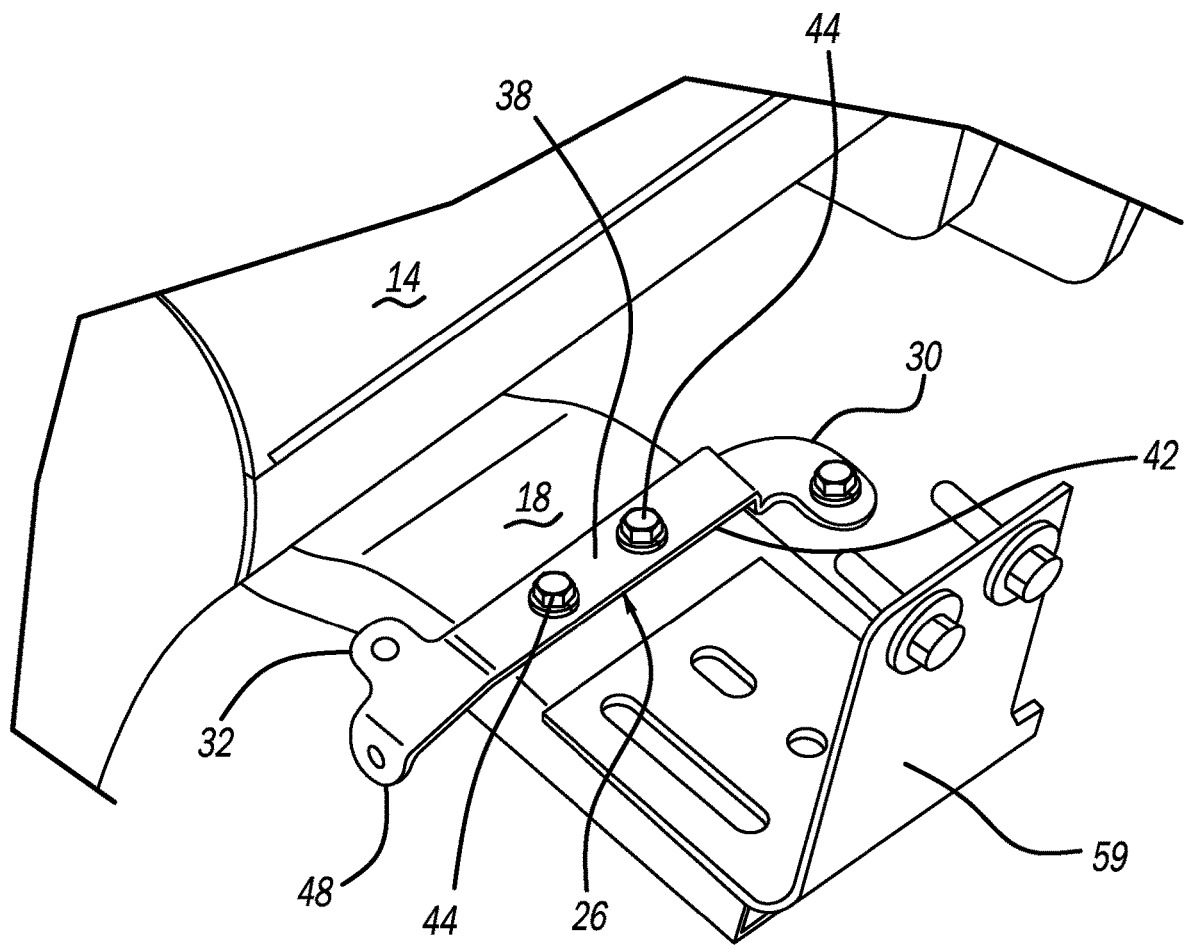
FIG. 5 is an isometric perspective view of a first step of installing the injector assembly relative to the component of the exhaust system.

Now referring to FIG. 5, a first step of installing valve assembly 20 is illustrated. While exhaust component 14 is illustrated in FIG. 5 as already being installed on vehicle frame 10, it should be understood that first bracket 26 is attached to cross-beam 18 before exhaust component 14 is installed. Exhaust component 14 is merely illustrated in FIG. 5 to show that valve assembly 20 is located very close to exhaust component 14 and to illustrate the tight packing constraints that are present for inclusion of valve assembly 20 relative to exhaust component 14.

As noted above, first bracket 26 is attached to cross-beam 18 before installation of exhaust component 14. To locate first bracket 26 relative to cross-beam 18, planar section 38 is located over cross-beam 18 and seat 42 is used as a locating feature to ensure that first bracket 26 is properly aligned relative to cross-beam 18. After properly locating first bracket 26 relative to cross-beam 18, fasteners 44 are used to secure first bracket 26 to cross-beam 18. After installation of first bracket 26, exhaust component 14 may be connected to the exhaust system 12 components located upstream from exhaust component 14. Because second bracket 28 having injector or valve 24 attached thereto is not connected to first bracket 26 during installation of exhaust component 14, the second bracket 28 and injector or valve 24 does not obscure or inhibit exhaust component 14 from being attached to the exhaust system 12.

Figure 6:
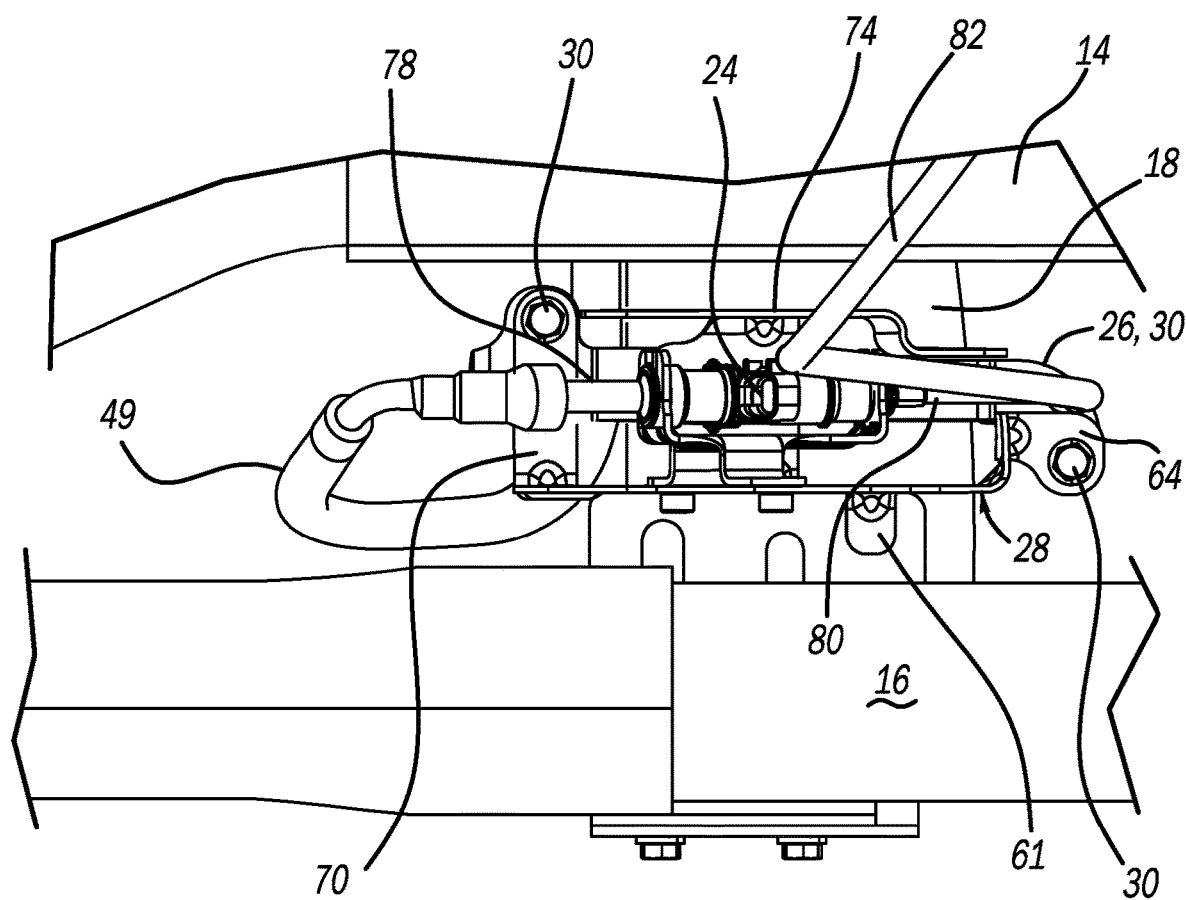
FIG. 6 is an overhead perspective view showing the completed injector assembly installed relative to the component of the exhaust system.

Now referring to FIG. 6, it can be seen that second bracket 28 has been connected to first bracket 26. To connect second bracket 28 to first bracket 26, third section 64 of first arm 58*a* is aligned with first end 30 of first bracket 26 and fastener 30 is used to secure each of these features together. Similarly, second section 70 of second bracket 28 is aligned with second end 32 of first bracket 26 and fastener 30 is used to secure each of these features together. Because second bracket 28 including injector or valve 24 is connected to first bracket 26 after installation of exhaust component 14, injector or valve 24 is not likely to be damaged during installation thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bracket assembly for locating an injector relative to a vehicle exhaust component, comprising:
    a first bracket configured to be attached to a cross-beam of a vehicle frame; and
    a second bracket configured to be attached to the first bracket and including a primary panel configured to support the injector relative to the vehicle exhaust component,
    wherein the first bracket includes a first end, an opposite second end, and a planar section connecting the first end and the opposite second end, the first end, the opposite second end, and the planar section collectively defining a seat configured for receipt of the cross-beam; and
    the second bracket includes a first arm extending outward from the primary panel configured to mate with the first end and a second arm extending outward from the primary panel configured to mate with the second end.

2. The bracket assembly according to claim 1, wherein the first arm includes a first section co-planar with the primary panel, a second section that extends orthogonally outward and downwardly from the first section, and a third section that extends orthogonally outwardly from the second section and is configured to be attached to the first end of the first bracket.

3. The bracket assembly according to claim 1, wherein the second arm includes a first section co-planar with the primary panel having a downwardly extending leg that transitions to a second section that extends substantially orthogonally outward from the leg and is configured to be attached to the opposite second end of the first bracket.

4. The bracket assembly according to claim 1, wherein the second bracket includes a third arm co-planar with the primary panel that extends downwardly from the primary panel and transitions to a pad that extends outward the third arm.

5. The bracket assembly according to claim 1, further comprising a heat shield attached to the second bracket that is configured to shield the injector from heat generated by the exhaust component.

6. The bracket assembly according to claim 1, wherein the first bracket includes an outwardly extending tab connected to one of the first end and the opposite second end.

7. The bracket assembly according to claim 6, wherein the outwardly extending tab defines an aperture configured for receipt of a clip.

8. The bracket assembly according to claim 1, wherein the planar section is offset from the first end and the opposite second end.

9. The bracket assembly according to claim 8, wherein the planar section is connected to the first end and the opposite second end by downwardly extending connection sections that, in combination with the first end, opposite second end, and planar section, define the seat.

10. The bracket assembly according to claim 1, wherein each of the first bracket and the second bracket include a plurality of strengthening ribs.

\* \* \* \* \*